(12) United States Patent
Traore et al.

(10) Patent No.: US 10,812,495 B2
(45) Date of Patent: Oct. 20, 2020

(54) SECURE PERSONALIZED TRUST-BASED MESSAGES CLASSIFICATION SYSTEM AND METHOD

(71) Applicant: UVic Industry Partnerships Inc., Victoria (CA)

(72) Inventors: Issa Traore, Victoria (CA); Marcelo Luiz Brocardo, Santa Catarina (BR)

(73) Assignee: UVic Industry Partnerships Inc., Victoria, BC (CA)

( * ) Notice: Subject to any disclaimer, the term of this patent is extended or adjusted under 35 U.S.C. 154(b) by 225 days.

(21) Appl. No.: 16/153,641

(22) Filed: Oct. 5, 2018

(65) Prior Publication Data

US 2019/0109863 A1 Apr. 11, 2019

Related U.S. Application Data

(60) Provisional application No. 62/569,250, filed on Oct. 6, 2017.

(51) Int. Cl.
*H04L 29/06* (2006.01)
*G06K 9/62* (2006.01)
*G06N 20/00* (2019.01)

(52) U.S. Cl.
CPC .......... *H04L 63/126* (2013.01); *G06K 9/6217* (2013.01); *H04L 63/1483* (2013.01); *G06N 20/00* (2019.01); *H04L 63/168* (2013.01)

(58) Field of Classification Search
CPC ... H04L 63/148; H04L 63/126; H04L 63/168; G06N 20/00; G06K 9/6217
USPC .......................................................... 726/22
See application file for complete search history.

(56) References Cited

U.S. PATENT DOCUMENTS

| 9,292,493 | B2 | 3/2016 | Chandramouli et al. |
| 2005/0262209 | A1* | 11/2005 | Yu ........................... H04L 51/28 709/206 |
| 2009/0178144 | A1* | 7/2009 | Redlich ............... G06F 21/6209 726/27 |

(Continued)

OTHER PUBLICATIONS

Calix, K., et al. "Stylometry for e-mail author identification and authentication." Proceedings of CSIS research day, Pace University (2008): 1048-1054. (Year: 2008).*

(Continued)

*Primary Examiner* — Syed A Zaidi
(74) *Attorney, Agent, or Firm* — Klarquist Sparkman, LLP

(57) ABSTRACT

Technologies are described for authenticating a sender identity of an online message. For example, an online message having a purported sender identity can be obtained. Various features can then be extracted from the message, including stylometric features, origin location features, attached file features for any files attached to the message, and embedded URL features. The extracted features can then be compared to a sender profile for a known sender identity matching the purported sender identity, or to one or more sender profiles for recognized suspicious senders if the purported sender identity does not match a known sender identity. The sender profile for a given sender identity can include features extracted from one or more messages previously sent by the sender identity. A global risk score for the message indicating a likelihood that the purported sender identity is inauthentic can be determined based at least in part upon the comparison.

19 Claims, 10 Drawing Sheets

(56) References Cited

U.S. PATENT DOCUMENTS

| | | | | |
|---|---|---|---|---|
| 2010/0332601 | A1* | 12/2010 | Walter | H04L 51/12 709/206 |
| 2012/0254333 | A1 | 10/2012 | Chandramouli et al. | |
| 2015/0195171 | A1* | 7/2015 | Mermoud | H04L 43/106 370/253 |
| 2016/0036842 | A1* | 2/2016 | Lee | H04L 51/12 726/4 |
| 2018/0227282 | A1* | 8/2018 | Lee | H04W 12/06 |
| 2018/0367511 | A1* | 12/2018 | Chichibu | H04W 4/14 |
| 2019/0050388 | A1* | 2/2019 | Eugster | G06F 40/253 |

OTHER PUBLICATIONS

Martinez-Romo, Juan, and Lourdes Araujo. "Detecting malicious tweets in trending topics using a statistical analysis of language." Expert Systems with Applications 40.8 (2013): 2992-3000. (Year: 2013).*

Moon, Jongsub, et al. "An approach for spam e-mail detection with support vector machine and n-gram indexing." International Symposium on Computer and Information Sciences. Springer, Berlin, Heidelberg, 2004. (Year: 2004).*

NPL Search Results (Year: 2020).*

Brocardo, Marcelo Luiz, Issa Traore, and Isaac Woungang. "Toward a framework for continuous authentication using stylometry." 2014 IEEE 28th International Conference on Advanced Information Networking and Applications. IEEE, 2014. (Year: 2014).*

NPL Search Terms (Year: 2020).*

Abbasi et al., "Writeprints: A stylometric approach to identity-level identification and similarity detection in cyberspace," *ACM Trans. Inf. Syst.*, vol. 26, No. 2, Article 7, pp. 1-29, Mar. 2008.

Bishop, "Pattern Recognition and Machine Learning (Information Science and Statistics)," *Springer-Verlag New York, Inc.*, Secaucus, NJ, USA, 2006.

Brocardo et al., "Continuous Authentication Using Micro Messages," *12th Annual Conference on Privacy, Security and Trust (PST2014)*, Toronto, Ontario, Canada, Jul. 22-24, 2014.

Brocardo et al., "Authorship Verification using Deep Belief Network Systems," *International Journal of Communication Systems*, 2017.

Canales et al., "A stylometry system for authenticating students taking online tests," *CSIS, Pace University*, May 6, 2011.

Chang, "Boosting SVM Classifiers with Logistic Regression," Technical report, *Institute of Statistical Science—Academia Sinica*, Taipei, Taiwan, 2003.

Cho et al., "Gaussian-Bernoulli Deep Boltzmann Machine," In *Neural Networks (IJCNN), The 2013 International Joint Conference on*, pp. 1-7, IEEE, 2013.

Fayyad et al., "Multi-interval discretization of continuous valued attributes for classification learning," In *Thirteenth International Joint Conference on Artificial Intelligence*, vol. 2, pp. 1022-1027, Morgan Kaufmann Publishers, 1993.

Hinton, "A practical guide to training restricted boltzmann machines," *Momentum*, 9(1), 2010.

Homem et al., "Authorship identification and author fuzzy 'fingerprints'," In *Fuzzy Information Processing Society (NAFIPS), 2011 Annual Meeting of the North American*, pp. 1-6, Mar. 2011.

Karim et al., "Clustering IP Addresses Using Longest Prefix Matching and Nearest Neighbor Algorithms," In: Zhang C., W. Guesgen H., Yeap WK. (eds) *PRICAI 2004: Trends in Artificial Intelligence, PRICAI 2004, Lecture Notes in Computer Science*, vol. 3157, pp. 965-966, Springer, Berlin, Heidelberg, 2004.

Kjell et al., "Discrimination of authorship using visualization," *Information Processing & Management*, 30(1):141-150, 1994.

Klimt et al., "The Enron Corpus: A New Dataset for Email Classification Research," In *Machine learning: ECML 2004*, pp. 217-226, Springer, 2004.

Koppel et al., "Authorship verification as a one-class classification problem," In *Proceedings of the 21st international conference on Machine learning, ICML '04*, pp. 62-69, Banff, Alberta, Canada, 2004, ACM.

Sanderson et al., "Short text authorship attribution via sequence kernels, markov chains and author unmasking: an investigation," In *Proceedings of the 2006 Conference on Empirical Methods in Natural Language Processing, EMNLP '06*, pp. 482-491, Stroudsburg, PA, USA, 2006, Association for Computational Linguistics.

Stamatatos, "A survey of modern authorship attribution methods," *J. Am. Soc. Inf. Sci. Technol.*, 60:538-556, Mar. 2009.

Vapnik, "Estimation of Dependences Based on Empirical Data: Springer Series in Statistics (Springer Series in Statistics)," *Springer-Verlag New York, Inc.*, Secaucus, NJ, USA, 1982.

Wahba et al., "The Bias-Variance Tradeoff and the Randomized GACV," In *Advances in Neural Information Processing Systems*, pp. 620-626, *MIT Press*, 1999.

Zhou et al., "Online incremental feature learning with denoising autoencoders," In *15th International Conference on Artificial Intelligence and Statistics*, pp. 1453-1461, 2012.

* cited by examiner

SECURE PERSONALIZED TRUST-BASED MESSAGES CLASSIFICATION SYSTEM AND METHOD

CROSS REFERENCE TO RELATED APPLICATION

This application claims the benefit of U.S. Provisional Application No. 62/569,250, filed Oct. 6, 2017, entitled "SECURE PERSONALIZED TRUST-BASED MESSAGES CLASSIFICATION SYSTEM AND METHOD," which application is incorporated herein by reference in its entirety for all purposes.

BACKGROUND

One of the most pervasive current cyber-attacks is a phishing scam that is delivered predominantly by email or short message. Phishing emails are also used to spread insidious malware such as banking Trojans and ransomware.

Spear phishing is a particular form of phishing directed at a specific individual or organization, where the message is apparently from a sender who is known or trusted by the recipient. Several recent successful hacking incidents targeting high profile organizations started with spear phishing attacks.

Existing email security solutions consist primarily of anti-virus systems that filter emails by detecting and blocking malicious attachments, and spam detectors that filter unwanted emails by analyzing message patterns, keywords, and domain reputation. While these technologies are often very effective, they are not designed to prevent sophisticated spear phishing attacks. Since the messages used in spear phishing are crafted and customized using familiar terms and context, and appear to be coming from trusted sources, they do not fit expected anti-virus patterns, and as such can fly under the radar. Furthermore, those solutions monitor only incoming messages, and do not protect against local accounts being compromised and leveraged to send unwanted messages. As a result, many organizations that have advanced email security systems in place are still being victimized by spear phishing attacks.

The failure of existing email security solutions in addressing spear phishing is rooted in their inability to ascertain the authenticity of an email sender's identity. This challenge is underscored by how easy it is to spoof a sender identity of an email. For example, many email clients allow setting the sender's address and name by entering any kind of information, genuine or otherwise. Furthermore, compromised email accounts may be obtained online, unbeknownst to their legitimate owners, which can then be used to launch spear phishing attacks. Access to such compromised accounts gives the opportunity to fraudsters not only to build intimate knowledge of their targets, which is useful in customizing the message, but also to send messages from valid known or trusted email accounts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for authenticating a sender of an online message such as an email, tweet, or SMS. In one example, a personalized message classification system and model authenticates the identity of a sender of an online message and validates elements of the message by analyzing her writing style (also known as stylometric analysis) as well as her relationship to the sender. This can include extracting features from the message and comparing the extracted features to one or more stored sender profiles. The system and model can also protect a local account (e.g., a recipient's account) from being leveraged to send unwanted messages, e.g. to existing correspondents listed in the recipient's address book. This can be done by comparing outgoing messages to a sender profile for the account owner.

In an enrollment phase, sender profiles for known sender identities and recognized suspicious sender identities can be constructed and stored in a data store. The sender profile for a known sender identity can be constructed based at least in part upon features extracted from online messages which were confirmed to have been previously sent by the known sender identity, whereas the sender profile for a recognized suspicious sender identity can be constructed based at least in part upon features extracted from online messages which were determined to likely have been sent by the same recognized suspicious sender identity. The features used to construct the sender profiles can include stylometric features, message origin location features, attached file features, and embedded URL features, for example. The stylometric features can be determined via stylometric analysis, which can be used to identify the author of a document based on his or her writing style. Different machine learning algorithms can be used in stylometric analysis, such as Support Vector Machine (SVM), logistic regression, neural networks, deep learning models, etc.

In a verification phase, features can be extracted from a new online message (e.g., an online message received at a mail client or an online message requested to be sent by an online messaging account owner), and the extracted features can be compared with features of one or more sender profiles stored in the data store. Based at least in part on the comparison of the features, a risk score can be computed for the message.

For example, a computing device can obtain an online message having a purported sender identity. The computing device can extract various features from the message, such as stylometric features. The computing device can further determine whether a data store storing respective profiles for a plurality of known sender identities and recognized suspicious sender identities includes a profile associated with a known sender identity matching the purported sender identity. Upon identifying a stored profile for a known sender identity matching the purported sender identity, the computing device can compare the features extracted from the message with features in the identified profile. A risk score reflecting a likelihood that the purported sender identity is inauthentic can be determined by the computing device based at least in part upon results of the comparison, and the computing device can output the risk score (e.g., display the risk score to a mail user via a graphical user interface of a mail client).

DETAILED DESCRIPTION

Overview

Figure 1:
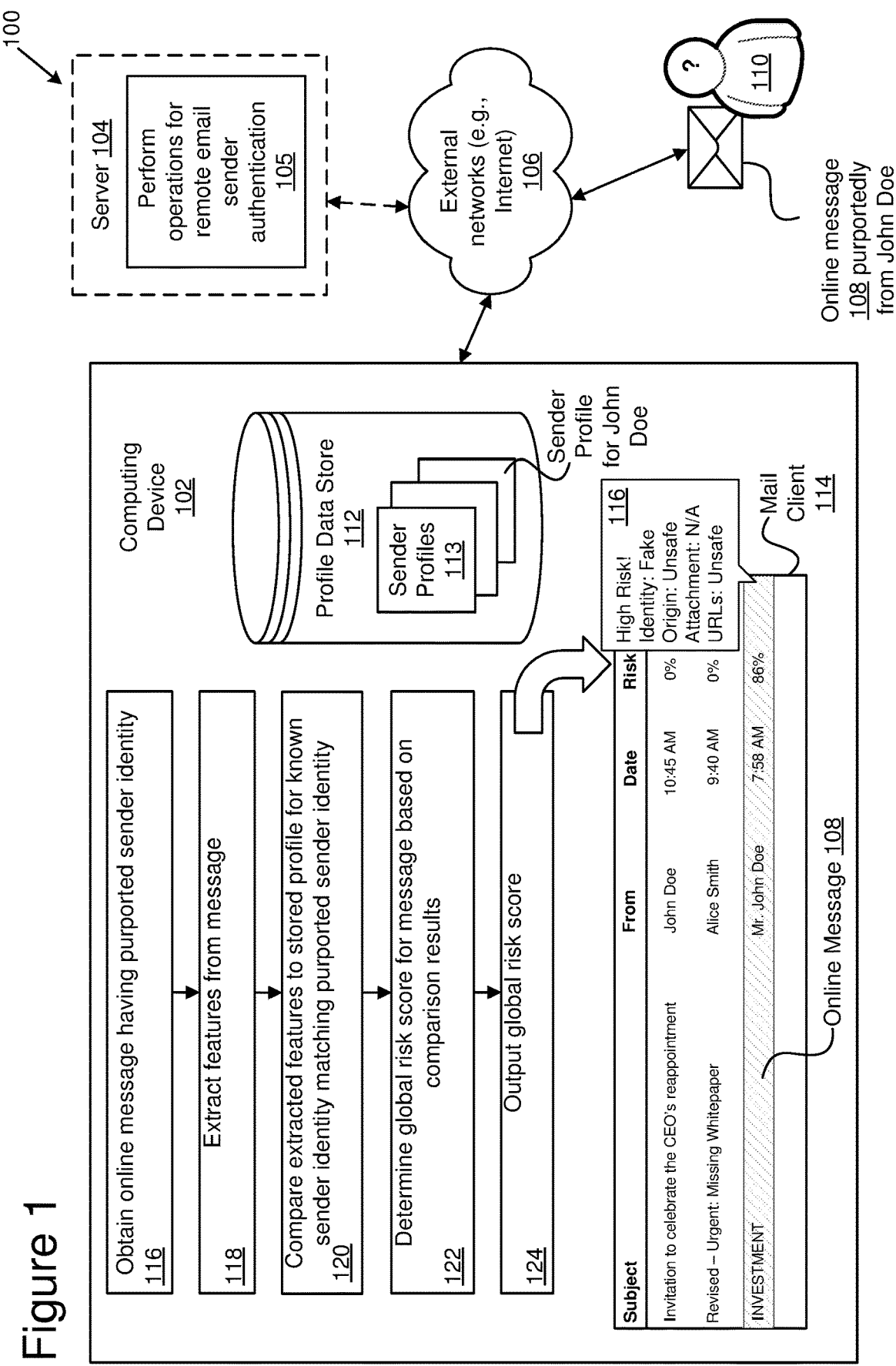
FIG. 1 is a diagram depicting an example environment for authenticating a sender of an online message.

The following description is directed to technologies for authenticating a sender of an online message. In some examples, the technologies can be implemented as a client/server application or standalone plugin in existing messaging tools, on desktop computers, laptop computers, and mobile devices. It can be deployed in the cloud and delivered as a service, as a client/server application, as a server-only application, or as a client-only application. In the case of a client/server application, the profile can be summarized as a key, and the information from the online message can be summarized in a privacy-preserving format and sent to the server for verification.

In accordance with the technologies described herein, a system and model automatically classifies incoming online messages (e.g., emails, tweets, short message service (SMS) messages, etc.) based on features extracted from the message and its contents. Using the same approach, outgoing messages to be sent from an online messaging account (e.g., an email account, social media account, etc.) can be compared, before they are actually sent, against a sender profile of an owner of the account in order to determine whether the account has been hijacked. This can be applied for detecting and protecting against phishing, unwanted spam messages, account hijacking, and other email crimes such as ransomware.

The automatic classification can include generating a global risk score for each message based on a global matching score, the global matching score can be generated based on individual matching scores for one or more of the following factors: message content, message origin location/route, attached file attributes, and uniform resource locators (URLs) embedded in the message. The global risk score indicates the level of trust that the recipient can have in the message. The higher the risk, the less trustworthy the message, and vice-versa.

The individual matching score for each factor can be determined based at least in part upon comparison of features extracted from the message for that factor with corresponding features of one or more sender profiles stored in a data store. The data store can store sender profiles for known senders (e.g., senders listed in the address book of the mail client), as well as sender profiles for recognized suspicious senders. The sender profile for a known sender can be generated using features extracted from messages previously determined to have been genuinely sent by the known sender identity. The sender profile for a recognized suspicious sender identity can be generated using features extracted from messages classified as untrustworthy, or messages obtained from public and private unwanted message repositories (e.g., stores of messages identified as malicious and/or unsolicited).

The sender profile for a given sender identity can be created via analysis of the various features extracted from the messages received from the sender identity, in an enrollment phase. The sender profile can then be updated upon receipt of additional messages from the sender. To create the sender profile, blocks of text may be extracted from the messages and analyzed based on writing styles through stylometric analysis, using machine learning classification. Origin locations extracted from the messages may be used to build a sender location profile, e.g., using a multi-criteria clustering algorithm. Further, any URLs embedded in the messages and files attached to the messages can be analyzed, e.g. for patterns, and incorporated in the sender profile.

The technologies described herein are not meant as a replacement for spam filtering tools. Rather, they are complementary. In one example deployment scenario, a spam filtering tool can first be used on one or more messages. The messages output from the spam filtering tool (e.g., the messages not flagged as "spam" by the spam filtering tool) can then be processed in the manner described herein to determine a global risk score.

Prior anti-spam and anti-phishing systems are binary classification systems which focus on separating deceptive from non-deceptive messages: a message is either deceptive or non-deceptive. In contrast, in the approach described herein, a risk score for a message is determined based on the likelihood the message was indeed sent by a purported sender of the message. Towards this end, three types of sender identities are considered: known identities, recognized suspicious identities (alternatively referred to as "shadow identities"), and new identities (alternatively referred to as "unverified identities"). Known identities are identities known to the recipient based on previous correspondence; a sender having a known identity may be included in an address book of a mail client of the recipient, for example. Recognized suspicious identities are unknown identities that can be extracted by mining previous messages classified as untrustworthy, or messages obtained from public and private unwanted message repositories. New identities are the ones that do not fit in any of the aforementioned two categories.

Further, prior message filtering systems often focus on incoming messages only. In contrast, the technologies described herein can be used for both incoming and outgoing message verification. For incoming messages, the goal is to check whether the identity of the sender is genuine or fake. For outgoing messages, the goal is to ensure that the account owner is the genuine author of the messages.

Environments for Authenticating a Sender of an Online Message

FIG. 1 is a diagram depicting an example environment 100 for authenticating a sender of an online message. Example environment 100 includes a computing device 102 communicating with a server 104 via external networks 106. Computing device 102 is configured to obtain an online message 108 from a sender 110. Online message 108 has a purported sender identity, which may or may not be the genuine identity of sender 110. In the depicted example, the purported sender identity is John Doe, who is known to the message recipient (e.g., the message recipient has previously received messages confirmed to have been sent by John Doe, and thus John Doe is a known sender identity).

Computing device 102 includes a local profile data store 112. In other examples, the profile data store may be stored remotely (e.g., at server 104) and accessed by computing device 102 via external networks 106. Profile data store 112 can include non-transitory memory storing a plurality of sender profiles 113. Sender profiles 113 can include sender profiles associated with known sender identities; in the depicted example, a sender profile for the known sender identity John Doe is stored in profile data store 112. Sender profiles 113 can also include sender profiles associated with recognized suspicious sender identities ("shadow profiles" or "unattributed profiles"). The unattributed profiles can be used to track serial senders. Each unattributed profile can be assigned a unique identifier (ID) generated by the system, referred to as a "shadow identity." In some examples, the sender profiles for known sender identities may be stored in a separate data store, or a separate portion of a data store, from the unattributed profiles.

Computing device 102 further includes a mail client 114. Mail client 114 can include a graphical user interface (GUI) displaying messages received at the mail client and risk scores for the messages, as discussed further below.

In addition to server 104 and computing device 102, environment 100 can include additional computing devices (e.g., server computers, desktop computers, database systems, mobile devices, and/or other types of computing devices) and/or software resources supporting the authentication of a sender of an online message.

Example environment 100 illustrates operations that are performed by computing device 102 to authenticate a sender of an online message. In other examples, however, server 104 may perform at least some of the operations involved in authenticating the sender. For example, server 104 may perform one or more operations 105 for remote email sender authentication.

As depicted at 116, an online message having a purported sender identity is obtained. For example, online message 108 sent by sender 110 to via network 106, having the purported sender identity John Doe, can be obtained at mail client 114 of computing device 102.

As depicted at 118, features can be extracted from the message. For example, as discussed further below with reference to FIGS. 2 and 3, stylometric features, origin location features, embedded URL features, and/or attached file features may be extracted from the message.

As depicted at 120, the extracted features can be compared to a stored profile for a known sender identity matching the purported sender identity. In the depicted example, the purported sender identity of message 108 matches the known sender identity John Doe, and the features extracted from the message are compared to the profile stored in profile data store 112 for John Doe. As discussed further below with reference to FIGS. 2 and 3, the comparison can include comparing stylometric features extracted from the message to stylometric features of the stored profile for the known sender identity, comparing origin location features extracted from the message to origin location features in the stored profile for the known sender identity, comparing embedded URL features extracted from the message to embedded URL features in the stored profile for the known sender identity, and/or comparing attached file features extracted from the message to attached file features in the stored profile for the known sender identity. These comparisons can yield individual matching scores for the different types of features, which can serve as a basis for determination of a global matching score for the message. The global matching score can indicate an extent to which the message "matches" messages previously confirmed to have been sent by John Doe.

In other examples, however, the purported sender identity may not match a known sender identity. In such examples, the extracted features can instead be compared to the stored unattributed profiles, to establish whether the message is likely to have been sent by one of the recognized suspicious sender identities. In this case, the extracted features can be compared to each of a plurality of stored profiles for recognized suspicious sender identities to determine respective global matching scores. If the global matching score for one of the stored profiles for a recognized suspicious sender identity is greater than a predetermined threshold, the message may be associated with that recognized suspicious sender identity (e.g., the features extracted from the message may be incorporated in the stored profile for that recognized suspicious sender identity). Additionally or alternatively, an email address from which the online message was purportedly sent can be compared to a list of email addresses associated with the recognized suspicious sender identities to establish whether the message is likely to have been sent by one of the recognized suspicious sender identities.

It will be appreciated that a high global matching score obtained when a message is compared with a sender profile for a recognized suspicious sender identity will produce a high global risk score for the message, whereas a high global matching score obtained when a message is compared with a sender profile for a known sender identity will produce a low global risk score for the message. Accordingly, the global matching score and global risk score may be directly proportional when a message is compared with a sender profile for a recognized suspicious sender identity, and inversely proportional when a message is compared with a sender profile for a known sender identity.

As depicted at 122, a global risk score for the message can be determined based on results of the comparison performed at 120. This can include first determining individual matching scores for the different categories of features, determining a global matching score for the message based on the individual risk scores, and then determining a global risk score for the message based on the global matching score, as discussed further below with reference to FIGS. 2 and 3. In one example, the global risk scores are percentages (e.g., numbers between 0 and 100) reflecting a likelihood that the purported sender identity of the message is not authentic.

At 124, the global risk score for the message can be output. For example, as shown, the global risk score can be displayed via a graphical user interface element (e.g., a pop-up window or alert) of mail client 114. In this case, the global risk score for message 108 is determined to be 86%, indicating a high risk that the purported sender identity (John Doe) is not the authentic identity of sender 110.

Other classification information can also be displayed by the mail client in addition to the risk score. This can include a trust level for the message represented using a color coding scheme. For instance, a 4-level color coding scheme can be used: red (high risk), orange (medium risk), orange (mild risk), and green (safe). Additional information regarding the risk associated with the message can also be displayed when a cursor hovers over the message. For example, as shown in FIG. 1, a window 116 can be displayed with further information regarding the contribution of different factors to the global risk score determination. As shown, this can include information regarding the sender identity (e.g., an indication that the identity is likely real/fake), information regarding the origin location of the message (e.g., an indication that the origin location appears to be safe/unsafe), information regarding any files attached to the message, and/or information regarding any URLs embedded in the message. In the depicted example, online message 108 does not include any attached files, and thus window 116 indicates "Attachment: N/A". However, online message 108 does include one or more embedded URLs determined to be unsafe, and thus window 116 indicates "URLs: Unsafe".

Additionally, the messages can be stored automatically in trust folders corresponding to the aforementioned risk levels. That way, the recipient can decide which emails to read and which ones require a greater level of caution. Initially, different message folders can be created and set up with different trust levels. The folders can be created automatically by default, or manually by the user. A set of trust settings, generated using machine learning, can be associated with each folder. Settings for lowest trust folders can be created, e.g. through machine learning training using sample untrustworthy messages collected from public and private message datasets. Settings for highest trust folders can be established progressively based on sample incoming messages flagged automatically by the classification model, and further based on user feedback and preferences. Such inputs can be a set of trusted message origins, keywords, areas of interest (e.g., job-related interests or hobbies), etc., provided by the user during an enrollment phase, and updated over time. Such inputs can also include the user flagging a message or message origin as trustworthy or otherwise.

Enrollment and Verification of Online Messages

Figure 2:
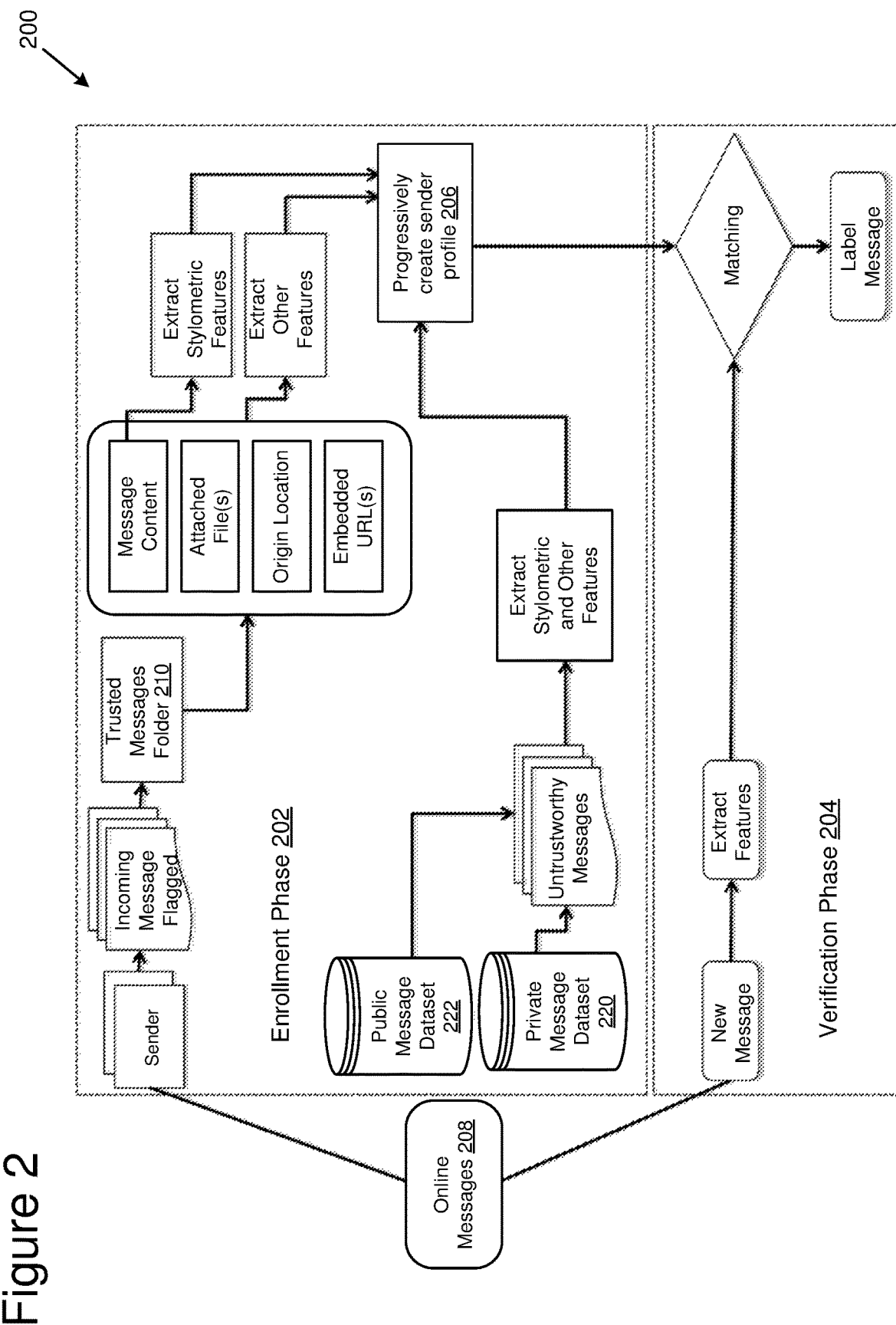
FIG. 2 is a diagram depicting an enrollment phase and a verification phase associated with authenticating a sender of an online message.

FIG. 2 is a diagram 200 depicting an enrollment phase 202 and a verification phase 204 associated with authenticating a sender of an online message.

In enrollment phase 202, sender profiles 206 are created and updated upon receipt of online messages 208 (e.g., emails, SMS, tweets, etc.) by a recipient (e.g., at an online messaging account of a recipient). The sender profiles created in enrollment phase 202 can be stored in a data store, such as profile data store 112 of FIG. 1. In some examples, sender profiles for different types of senders (e.g., known senders, recognized suspicious senders, and a messaging account owner) can be stored in separate data stores or databases.

Known sender identities are sender identities for senders who are known by the recipient and who have been flagged as trustworthy based on past communications. Individual sender profiles can be created and updated for each known sender identity based on one or more previous messages known to have been sent by the known sender identity. In the depicted example, messages received from known sender identities can be stored in a trusted messages folder 210.

In contrast, recognized suspicious sender identities are sender identities for senders who have been flagged in previous communications as untrustworthy. In some examples, messages received from recognized suspicious sender identities can be stored in a separate data store for untrustworthy messages (e.g., private message dataset 220), and grouped, based on their similarity, into separate clusters. Each cluster can be assigned a unique identifier, known as a shadow identity, and a corresponding profile can be generated using a subset of the messages from the cluster and stored in the recognized suspicious sender data store. This data store can be reinforced and updated periodically by adding additional sender profiles for recognized suspicious sender identities, e.g., additional sender profiles generated offline or by a separate server. For example, additional profiles can be generated from sample malicious or unwanted messages collected from public message repositories (e.g., public message dataset 222).

During the enrollment phase, a sender profile for a known sender identity can be created or updated based on features extracted from a message received from the known sender identity. These features can include stylometric features extracted from the contents of the message, as well as other features of the message (e.g., features associated with the origin location of the message, features associated with any files attached to the message, and features associated with any URLs embedded in the message). Sender profiles for recognized suspicious senders can be created or updated in a similar manner. Further, a sender profile for an owner of an online messaging account can be created in a similar manner, and used to check outgoing messages for hints of account hijacking.

In verification phase 204, a purported sender identity of a new incoming message can be verified by comparing it against the stored sender profiles. If the purported sender identity matches a known sender identity, the message can be verified against the stored sender profile for the known sender, and classified as genuine or untrustworthy.

However, if the purported sender identity does not match a known sender identity, the message can be compared against the stored sender profiles for recognized suspicious sender identities, for example in the manner discussed below with respect to FIG. 3. If a match is found (e.g., if a matching score is determined to be greater than a predetermined threshold), then the message can be associated with the recognized suspicious sender identity having the matching profile. This can include updating the sender profile for the recognized suspicious sender identity based on features extracted from the message. Further, at this stage, the message can be flagged as untrustworthy, and optionally stored in an untrustworthy message data store.

If the comparison of the message against the stored sender profiles for the recognized suspicious sender identities does not yield a match (e.g., if none of the matching scores are greater than a predetermined threshold), the sender identity of the message can be classified as an unverified identity. In this case, determination of the level of trust in the message sender, and thus the risk score, can be performed based on other factors. Even if these other factors give more positive outlook on the new sender, its labeling as unverified can remind the recipient of the message to be cautious with this particular message.

Risk Score Generation

Figure 3:
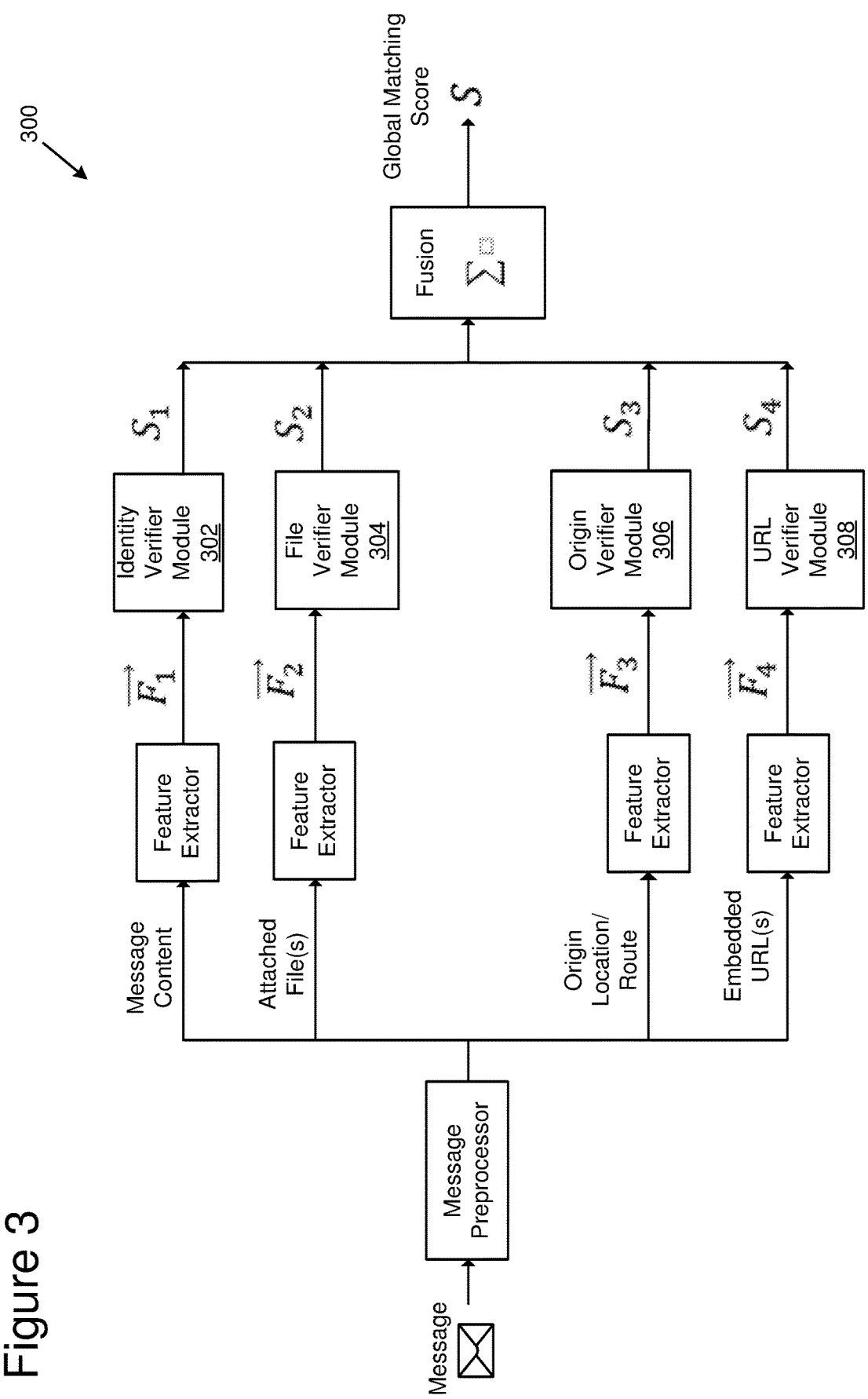
FIG. 3 is a diagram depicting modules involved in determining a global risk score of an online message and their respective inputs and outputs.

FIG. 3 is a diagram depicting a risk model including modules involved in determining a global risk score of an online message and their respective inputs and outputs. For example, the determination of the global risk score of an online message received by a recipient (or an online message requested to be sent by a messaging account owner) can be performed during a matching step of a verification phase (e.g., verification phase 204 of FIG. 2).

In the depicted example, the risk model aggregates four normalized matching scores computed for sender identity, file attachments, origin location, and embedded URLs. The different scores are aggregated using a fusion model, to generate a global matching score for the message, which in turn is used to generate a global risk score for the message. The global risk score can be displayed for a user of an online messaging account near the message, e.g., as shown in FIG. 1. The global risk score can also be converted in color flags (e.g. black, red, yellow, green) indicating the level of risk.

A message input to the risk model is preprocessed by extracting four types of information: message content, attached files attributes, message origin location/routing information, and embedded URLs. Each type of information is processed via separate modules. For example, as shown in FIG. 3, stylometric (message content) features are processed via an identity verifier module 302; features of any attached files are processed via file verifier module 304; origin location/route features are processed via origin verifier module 306; and features of any URLs embedded in the message are processed via URL verifier module 308.

For example, let i denote one of the aforementioned types of information, where $1 \leq i \leq 4$. Each type of information is processed by extracting a group of features stored in a feature vector $\vec{F}_i$. The feature vector is submitted to a classification model and matched against a trained profile. The classification model then outputs a matching or classification score $S_i$, which is a measure of how similar the features stored in the feature vector are to the features of the trained profile.

For example, as discussed further below with respect to FIGS. 4-6, message content information can be preprocessed by extracting a group of stylometric features from the message. The stylometric features can then be stored in a feature vector, which in turn can be submitted to a classification model (represented in FIG. 3 by identity verifier module 302) to obtain an individual matching score $S_1$ for the message contents.

If any files are attached to the message, features of the attached files can be extracted. The attached file features can then be stored in a feature vector, which in turn can be submitted to a classification model (represented in FIG. 3 by file verifier module 304) to obtain an individual matching score $S_2$ for the attached files.

Features associated with an origin location and/or route of the message can be extracted. The origin location/route features can then be stored in a feature vector, which in turn can be submitted to a classification model (represented in FIG. 3 by origin verifier module 306) to obtain an individual matching score $S_3$ for the message origin location/route.

Features associated with any URLs embedded in the message can be extracted. The embedded URL features can then be stored in a feature vector, which in turn can be submitted to a classification model (represented in FIG. 3 by URL verifier module 308) to obtain an individual matching score $S_4$ for the embedded URLs.

A global matching score S, used to determine a global risk score for the message, can be obtained by combining the individual matching scores $S_i$ using weighted matcher fusion model. In the weighted matcher fusion model, each matcher is assigned a weight $w_i$ based on its matching or classification error rate $e_i$. An initial error rate for each of the modules can be calculated by testing the corresponding module on a sample email dataset offline. The error rates can then be automatically updated online, progressively, by incorporating feedback on the accuracy of the module outputs.

The weight $w_i$ can be calculated as follows:

$$w_i = \frac{1}{e_i}\left(\frac{1}{\sum_{l=1}^{4}\frac{1}{e_l}}\right)$$

The weights are inversely proportional to the error rates; the more accurate the matcher the higher the weight. The weights are numbers between 0 and 1, and their total sum equal 1. Weights are assigned to the individual matchers based on their classification error rates.

The global matching score S can then be obtained as follows:

$$S = \sum_{i=1}^{4} w_i S_i$$

A global risk score R for the message can then be determined as a function of the global matching score. In some examples, the global risk score may be a percentage (0-100) indicating a likelihood that the message is inauthentic (e.g., a likelihood that the actual sender of the message is not the purported sender). The global risk score can be determined as the inverse of the global matching score:

$$R = \frac{1}{S}$$

Alternatively, the global risk score can be determined by training a machine learning classifer (e.g., neural network).

Identity Verification

Figure 4:
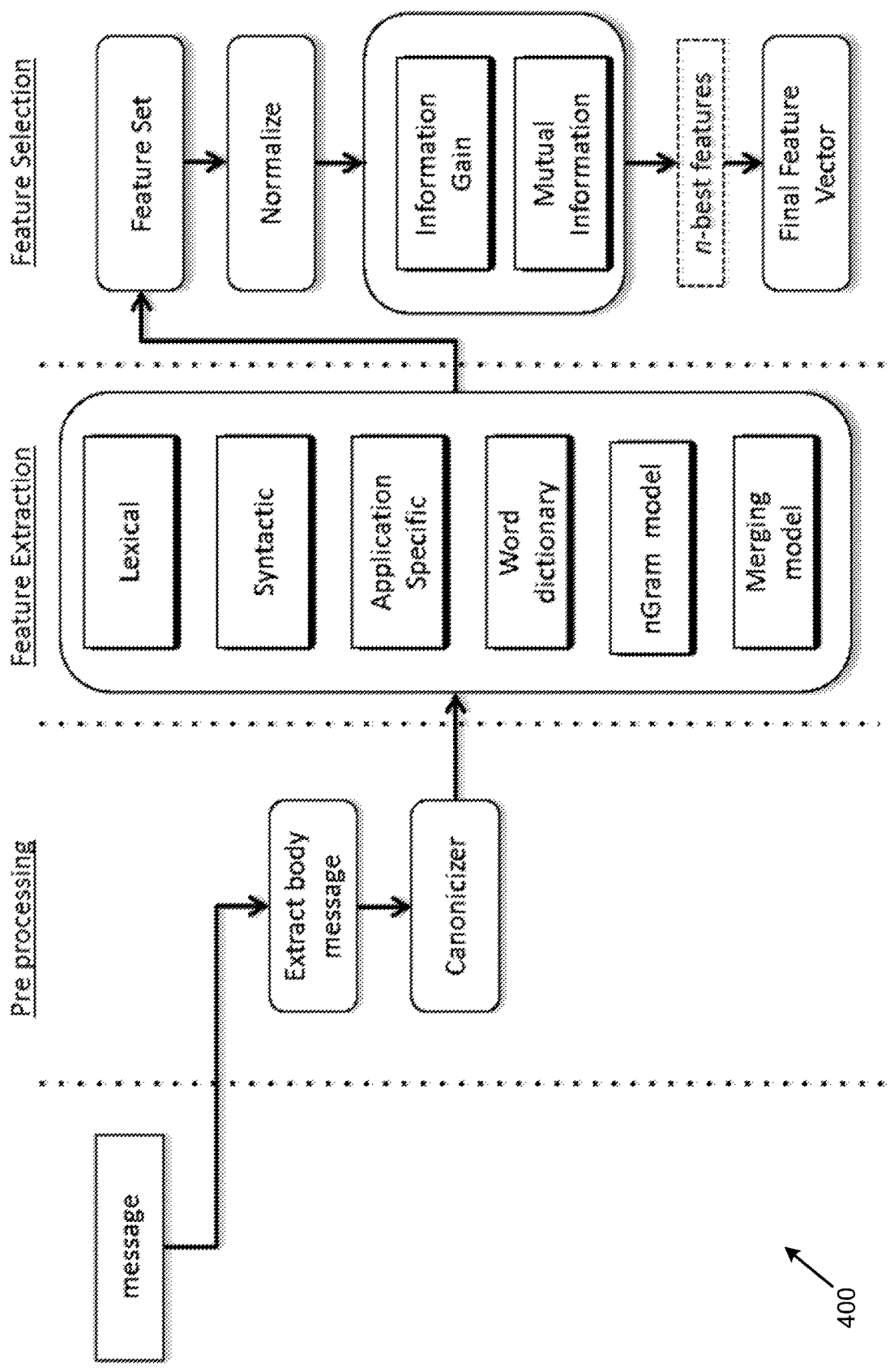
FIG. 4 is a diagram depicting pre-processing, feature extraction, and feature selection performed during stylometric analysis of the contents of an online message.

FIG. 4 is a diagram 400 depicting pre-processing, feature extraction, and feature selection performed during stylometric analysis of the contents of an online message. In some examples, these operations may be performed by identity verifier module 302 of FIG. 3.

Forensic authorship analysis involves inferring the authorship of a document by extracting and analyzing the writing styles or stylometric features from the document content. Authorship analysis can be carried out from three different perspectives: authorship attribution or identification, authorship verification, and authorship profiling or characterization. Authorship attribution consists of determining the most likely author of a target document among a list of known individuals. Authorship verification consists of checking whether a target document was written or not by a specific individual. Authorship profiling or characterization consists of determining the characteristics (e.g., gender, age, and race) of the author of an anonymous document.

Among the above three forms of stylometry analysis, authorship verification is the most relevant to authentication. Similar to authorship verification, authentication includes comparing sample writing of an individual against a model or profile associated with the identity claimed by that individual (1-to-1 identity matching). While a rich body of literature has been produced on authorship attribution/identification and authorship characterization using stylometry, limited attention has been paid to authorship verification using stylometry. In the example depicted in FIG. 4, authorship verification of an online message is performed using stylometric analysis.

Over a thousand stylistic features have already been identified and are used in stylometric analysis. A broad categorization of stylometric features include the following groups of features: lexical, structural, semantic, and application-specific. The global stylometric feature set used in the stylometric analysis disclosed herein includes a subset of these existing features, along with additional features determined via the n-gram feature model disclosed herein, which is described further below with reference to FIG. 5, and via the feature merging model disclosed herein, which is described further below with reference to FIG. 6).

In one non-limiting example, a stylometric feature vector $\vec{F}_1$ used for stylometric analysis (e.g., as shown in FIG. 3) can include previously identified features such as 528 lexical character features, 175 lexical word features, 362 syntactic features, 7 application-specific features, as well as features from the models identified herein. The features from the models identified herein can include the 50 most frequent 2-grams and 3-grams words per author (from the n-gram feature model), and merged features, whose number vary from one author to another (from the feature merging model).

The verification process compares unseen block of texts (e.g., a new message) against the model or profile associated with an individual (e.g., 1-to-1 identity matching), and then categorizes the block of text as genuine or impostor.

N-Gram Feature Model

Figure 5:
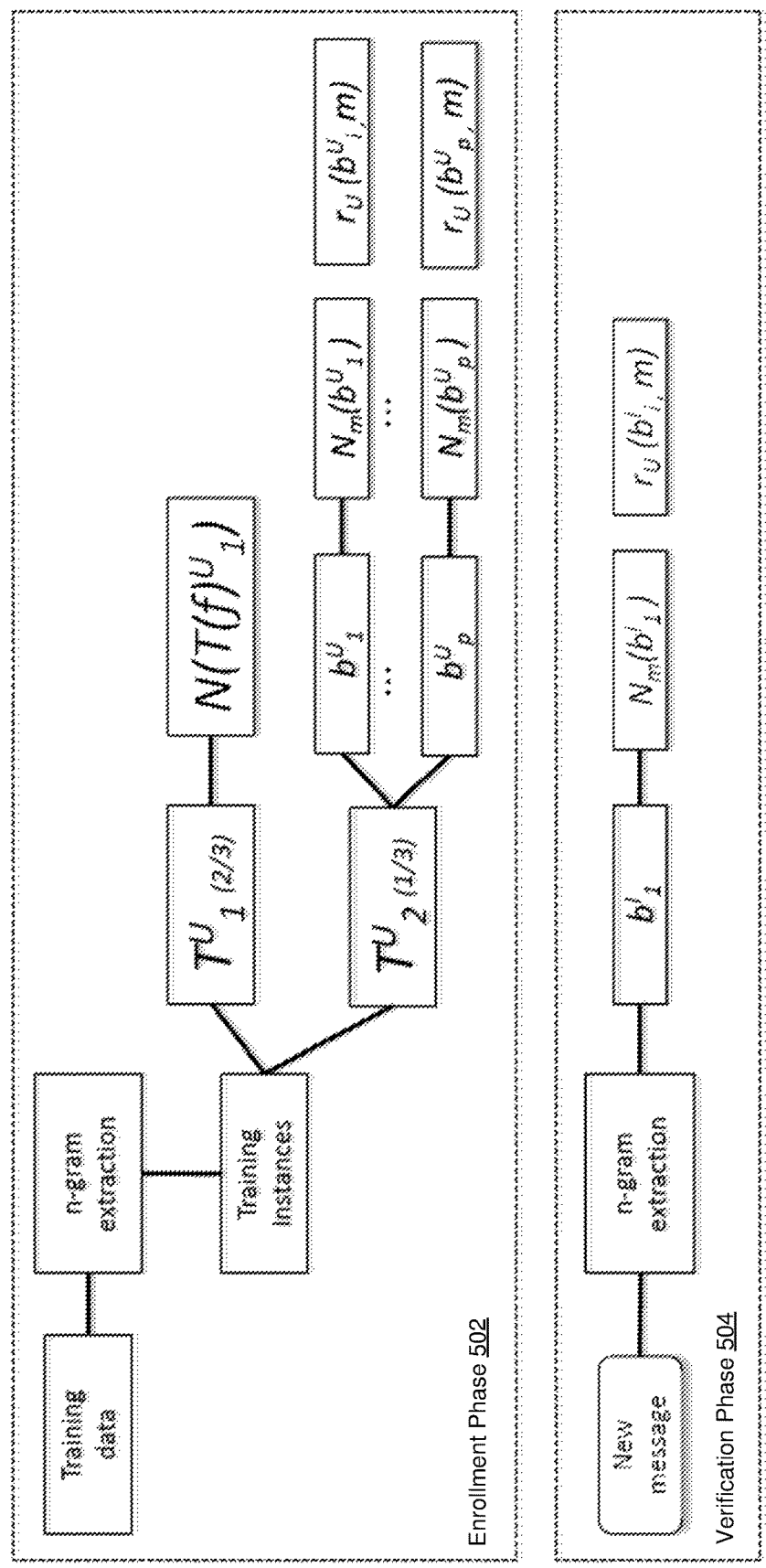
FIG. 5 is a diagram depicting an n-gram modeling technique that may be used during stylometric analysis of the contents of an online message.

FIG. 5 is a diagram 500 depicting an n-gram modeling technique that may be used during stylometric analysis of the contents of an online message.

The n-gram feature model disclosed herein extracts n-gram features using a supervised learning technique. Previous stylometric studies have yielded encouraging results with lexical features, particularly n-grams. N-gram features are noise tolerant and effective, and online messages (e.g., emails and tweets) are unstructured documents which lend themselves to extraction of n-gram features. Whereas prior approaches for n-gram modeling have included computing n-gram frequency in a given sample document, the approach described herein instead analyzes n-grams and their relationship with a training dataset.

Using the n-gram feature model described herein, a degree of similarity between a block b of characters and the profile of a user U can be measured. Whether or not a specific n-gram is present can be analyzed, and a real-valued similarity metric denoted $r_U(b,m)$ can be computed. Towards this end, two different modes of calculation for an n-gram represented by the binary variable m called mode can be considered: unique n-grams (m=0) and all n-grams (m=1). Here, "unique n-gram" refers to n-gram type; e.g., duplicated n-grams are counted once. Further, all n-grams with a frequency equal or higher than some number f can be considered.

The n-gram feature model includes a collection of profiles generated separately for individual message senders. The enrollment (training) phase, during which the sender's profile is built, involves two steps. During the first step, the sender's profile is derived by extracting n-grams from sample messages. During the second step, a user specific threshold is computed and used later in the verification phase.

As shown in FIG. 5, given a sender U, her training samples can be randomly divided into two subsets, denoted $T(f)_1^U$ and $T_2^U$, allocating ⅔ of the training samples to subset $T(f)_1^U$ and ⅓ of the training data to subset $T_2^U$. Subset $T_2^U$ is then divided into p blocks of characters of equal size: $b_1^U, \ldots, b_p^U$.

Given two individuals U and I, let $r_U(b_i^I, m)$ denote the percentage of unique n-grams shared by block $b_i^I$ (of individual I) and (training set) $T_1^U$, giving:

$$r_U(b_i^I, m) = \frac{|N_m(b_i^I) \cap N(T(f)_1^U)|}{|N_m(b_i^I)|}$$

where $N(T(f)_1^U$n denotes the set of all unique n-grams occurring in $T(f)_1^U$ with frequency f, $N_m(b_i^I)$ denotes the set of all unique n-grams occurring in $b_i^I$ (for m=0) or the set of all n-grams occurring (for m=1), and |X| denotes the cardinality of set X.

Given an individual U, the n-gram feature model can approximate the actual (but unknown) distribution of the ratios $(r_U(b_1^U, m), \ldots, r_U(b_p^U, m))$ (extracted from $T_2^U$) by computing the sample mean denoted $\mu_U$ and the sample variance $\sigma_U^2$ during the training.

A block b of characters is said to be a genuine sample of individual U if and only if $|r_U(b,m)| \geq (\in_U + \gamma)$, where $\in_U$ is a specific threshold for individual U, and $\gamma$ is a predefined constant:

$$\begin{cases} \text{genuine or 1 if } |r_U(b, m)| \geq (\in_U + \gamma) \\ 0, \text{otherwise} \end{cases}$$

The value of $\in_U$ for individual U can be derived using supervised learning.

Feature Merging Model

In accordance with the present disclosure, a pair of features can be merged into a single feature that considers only the information gain (IG) as selection criteria, using a feature merging model.

Let $X=[x_1, \ldots, x_n]$ denote an n-dimensional feature vector that describes our feature space. Let $S=\{X_1, \ldots, X_m\}$ denote the set of training samples for a given user. Each training sample corresponds to a vector of feature values $X_j=[x_{ij}]_{1 \leq i \leq n}$ where $x_{ij}$ is the value of feature $x_i$ for sample $X_j$.

The information entropy of feature $x_i$ denoted $H(x_i)$ is defined by:

$$H(x_i) = -\sum_{j=1}^{m} p(x_{ij}) \log_2 p(x_{ij})$$

where $p(x_{ij})$ denotes the probability mass function of $x_{ij}$. Given a variable y, with samples $y_1, \ldots y_M$, the conditional entropy of $x_i$ given y, denoted $H(x_i|y)$, is defined as:

$$H(x_i \mid y) = -\sum_{j=1}^{m} \sum_{k=1}^{M} p(x_{ij}, y_k) \log_2 p(x_{ij} \mid y_k)$$

Suppose that the dataset is composed by two classes (positive and negative). The information gain (IG) for a feature $x_i$ with respect to a class is computed as follows:

$$IG(Class, x_i) = H(Class) - H(Class \mid x_i)$$

Given two features x and y, let $P_y(x)$ denote the following ratio:

$$P_y(x) = \frac{IG(x)}{IG(x) + IG(y)}$$

Let $x_i$ and $x_k$ denote two features to be merged in a new feature $x_r$. The merging includes computing the values of features $x_r$ from the training samples. The merged values are computed as follows:

$$x_{rj} = P_{x_k}(x_i) \times x_{ij} + P_{x_i}(x_k) \times x_{kj}.$$

The decision to keep the new feature is made by comparing the corresponding information gain IG ($x_r$) to IG ($x_i$) and IG ($x_j$), respectively. The new feature $x_r$ is added to the feature set if and only if $\text{Max}(IG(x_i), IG(x_k)) < IG(x_r)$.

In this case, feature $x_r$ is added to the feature set while features $x_i$ and $x_k$ are removed from the set. The above process is repeated for all features by comparing two features at a time.

Since some features have different ranges of values, the selected features can be preprocessed before they are merged. The pre-processing can include normalizing the feature values between 0 and 1, and discretizing the numeric feature values into binary values (0 and 1) using a Fayyad and Irani discretization approach. The new features created after completing the merging process are also normalized between 0 and 1 and then added to the features list.

Feature Selection

Figure 6:
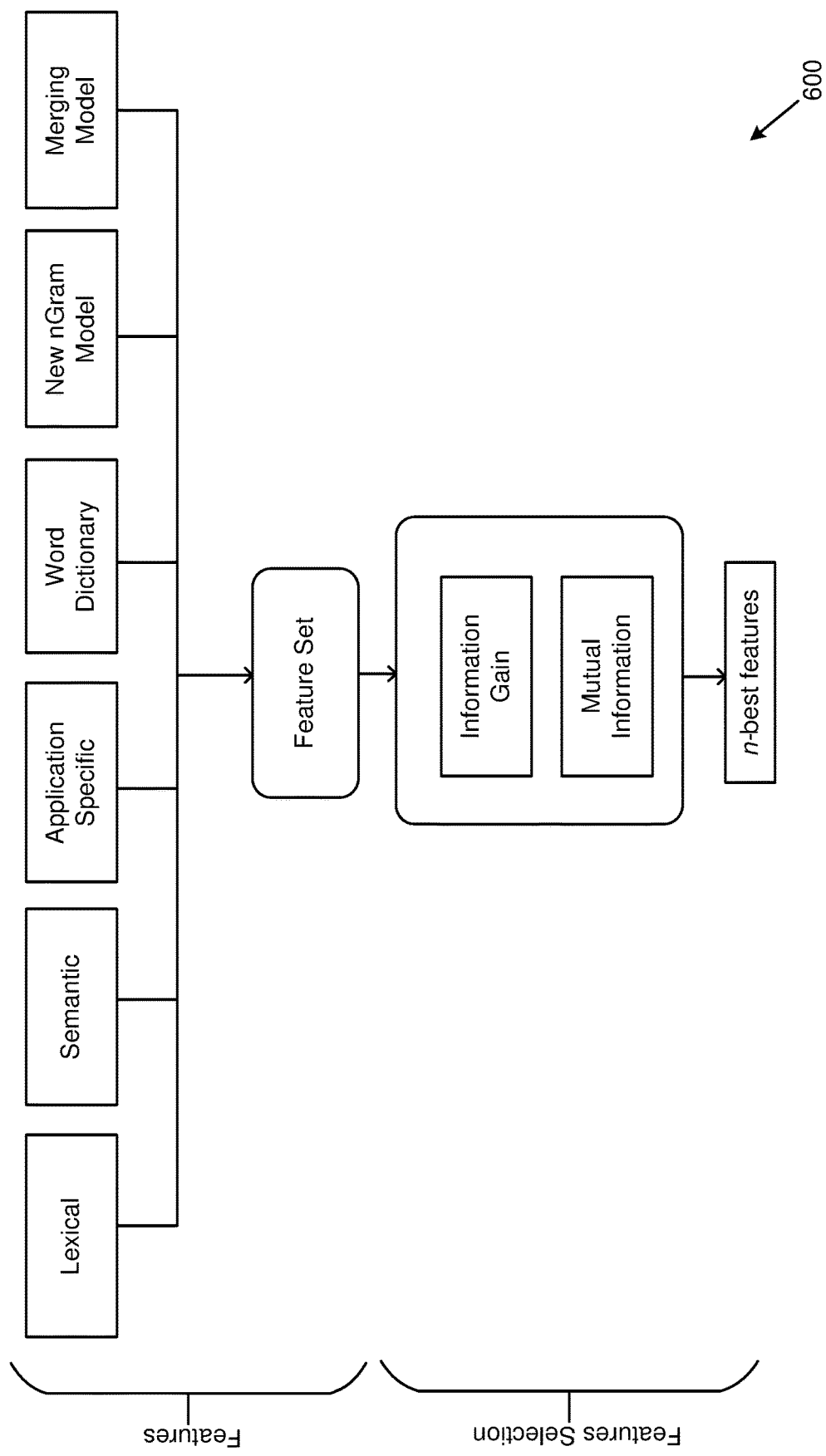
FIG. 6 is a diagram depicting a feature selection approach that may be used during stylometric analysis of the contents of an online message.

FIG. 6 is a diagram depicting a feature selection approach that can be used during stylometric analysis of the contents of an online message.

As mentioned earlier, over a thousand stylistic features have already been identified and are used in the literature along, with a wide variety of analysis methods. However, there is no agreement among researchers on which features yield the best results. As a matter of fact, analyzing a large number of features does not necessarily provide the best results, as some features provide very little or no predictive information.

Being able to keep only the most discriminating features per individual allows for reduction of the size of the data by removing irrelevant attributes, and thus improves the processing time for training and classification. This can be achieved by applying the feature selection measures disclosed herein, which allow finding a minimum set of features that represent the original distribution obtained using all the features.

The feature selection approach shown in FIG. 6 identifies and keeps only the most discriminating features, and also identifies new sets of relevant features. From the raw stylometric data, numeric feature vectors that represent term frequencies of each of the selected features are derived. All frequencies are normalized between 0 and 1. Each user has a specific feature set that best represents his writing style.

An ideal feature is expected to have high correlation with a class and low correlation with any other features. Based on this concept, the correlation between a feature and a class is measured by computing the information gain (IG), and the correlation between a pair of features is measured by computing the mutual information (MI).

For the purpose of feature selection, only features with non-zero information gain are retained, and a feature is removed when the mutual information is higher than a threshold (e.g., 95%).

By computing the IG for features and MI for pairs of features, features with very little or no predictive information and high correlation are identified and removed for each user. In the end, each individual ends up with a subset of features that are specific to their unique profile.

File Attachment Verification

Legitimate message senders tend to follow a consistent file sending pattern. Returning to FIG. 3, file verifier module 304 can be used to determine an individual matching score which reflects the extent to which features associated with files attached to the message match features associated with files attached to previous messages sent by the sender profile used in the comparison.

The approach is to read key file attributes without opening attached files and determine whether they match previous pattern for the sender. The following file attributes can be extracted from each attached file: file name, file format, and file size. As shown in FIG. 3, a feature vector (denoted $\vec{F}_2$) is extracted from these attributes. Table 1 outlines the corresponding features.

TABLE 1

File Attachment Features

| Factors | Extracted Features |
|---|---|
| File format | Set of file formats previously used by the sender, e.g. {zip, jpg, doc, docx, xls, ppt, txt, . . . } |
| File size | Average file size |
| | Standard deviation |
| File name (without the Extension) | Total number of characters (C) |
| | Average length in terms of number of characters |
| | Average length in terms of number of vowels (V) |
| | Ratio of number of letters to C |
| | Total number of lower character/C |
| | Total number of upper characters/C |
| | Total number of digital characters/C |
| | Total number of white-space characters/C |
| | Total number of tab space characters/C |
| | Number of special characters (%, &, etc.)/C (23 features) |
| | Ratio of number of digits to C |
| | Ratio of number of vowels (a, e, i, o, u) divided by V |

Different machine learning techniques can be applied to classify the extracted file attachment features. In one example, a hybrid algorithm that combines Support Vector Machine (SVM) and logistic regression can be used for classification. SVM alone can achieve relatively high accuracy. However, the goal is also to compute the matching score $S_2$ as an output of the classification. Although SVM is a non-probabilistic classifier, probability estimates can be obtained by integrating SVM with logistic regression into a more robust hybrid classifier (referred to as SVM-LR). The extracted features $\vec{F}_2$ can be processed using SVM, and the output of the SVM ($f(\vec{F}_2)$) can be submitted to a logistic function to compute the score for the file verifier module as follows:

$$S_2 = \frac{1}{1 + e^{f(\vec{F_2})}}$$

Message Origin Location/Route Verification

Legitimate email senders tend to have consistent locations from which they send messages. By maintaining historical records of valid locations used by senders, unusual locations can be detected and flagged as suspicious and risky.

In the enrollment phase, a message origin profile can be built for each known sender. Given a set of previous emails received from a sender, origins of the messages can be detected using IP geolocation services. Each location can be represented as a 3-dimensional vector, as follows:

$$\vec{F_3} = \begin{pmatrix} \text{latitude} \\ \text{longitude} \\ \text{IP address} \end{pmatrix}$$

During the training phase, the sender location profile is built using multi-criteria clustering algorithm. A set of clusters are generated by the algorithm, each including a set of similar or neighboring locations. The obtained clusters are stored as the location profile for the sender, which can be part of the sender profile for the sender.

The aforementioned location profile can be built in the same way for known senders' identities as well as shadow identities. Samples of messages associated with each shadow identity can be used to create their location profile.

Verification of the origin of a new message can be carried out by extracting and comparing a corresponding message origin location vector with a location profile in a sender profile of a known sender matching a purported sender of the new message. Alternatively, if the purported sender identity of the new message does not match a known sender identity, the message origin location vector can be compared with location profiles in sender profiles of recognized suspicious senders, to see if there is a match. The verification can be performed using origin verifier module 306 of FIG. 3, for example. This can include calculating the distance of the origin of the message from the profile clusters, and taking the normalized minimum distance as the output $S_3$.

For a new sender (e.g., with no existing matching profile), the message origin location can be compared against all existing profiles, and the normalized minimum distance can be returned as the output $S_3$.

This approach can use a nearest neighbors clustering algorithm based on two different similarity metrics: distance based on (latitude, longitude) measuring location proximity, and an IP address similarity metric based on a longest prefix match between IPs (denoted lpm).

Let $$\vec{L_i} = \begin{bmatrix} lat_i \\ long_i \\ IP_i \end{bmatrix}$$

denote a location vector consisting of latitude, longitude, and IP address, respectively. The distance $d(\vec{L_i},\vec{L_j})$ between two locations $\vec{L_i}$ and $\vec{L_j}$ is obtained as:

$$d(\vec{L_i}, \vec{L_j}) = \frac{|lat_i - long_j|}{\Delta_{lat_{max-min}}} + \frac{|long_i - long_j|}{\Delta_{long_{max-min}}} + \frac{lpm(IP_i, IP_j)}{\Delta_{lpm_{max-min}}}$$

The distance is calculated as the deviation between the features divided by the deviation between the maximally and minimally possible values for the features. An outline of the above algorithm is given in Table 2 below.

TABLE 2

Location Clustering Algorithm

Input:
| | |
|---|---|
| L = {$\vec{L_1}$, ... , $\vec{L_m}$} | //set of locations from message samples |
| D = $[d_{ij}]_{1 \leq i, j \leq m}$ | // distance matrix between locations |
| δ | //location distance/similarity threshold |
| C | //list of resulting clusters |

Output:
| | |
|---|---|
| $c_1 \leftarrow \{\vec{L_1}\};$ | //initialize first cluster and add it to $C_1$ |
| $C \leftarrow C \cup \{c_1\};$ | |
| $k \leftarrow 1;$ | |
| for r = 2 to m do | |
|   find the $\vec{L_x}$ in some cluster $c_x \in C$ such that $d(\vec{L_x}, \vec{L_r})$ is the smallest | |
|   if ($d(\vec{L_x}, \vec{L_r}) < δ$ ) | |
|   then $c_x \leftarrow c_x \cup \{\vec{L_r}\}$ | //existing cluster |
|   else | |
|     $k \leftarrow k + 1;$ | //new cluster |
|     $c_k = \{\vec{L_r}\};$ | |
|     $C \leftarrow C \cup \{c_k\};$ | |

Embedded URL Verification

URL verifier module 308 of FIG. 3 can be used to determine an individual matching score which reflects the extent to which any URLs embedded in the message match a pattern of embedded URLs in previous messages sent by the sender profile to which the message is being compared. The idea is to extract all the URLs embedded in the message and analyze each of them separately to establish whether they are legitimate or malicious.

Given a message m, let URLs(m) denote the set of URLs embedded in the message. The structure of a URL is a hierarchy consisting of different levels separated by a dot (•). The root of the hierarchy is a top-level domain (TLD), followed by a second-level domain (SLD) directly below it, and in some cases, followed by a third-level (3LD), and a fourth-level domain (4LD), etc. For example, in the URL www.dmv.ca.gov, .gov is the TLD, ca is the SLD of the .gov TLD, while dmv is a 3LD.

For each URL u∈URLs(m), a set of features can be extracted from the SLD (second level domain), denoted $\vec{u_F}$ and outlined in Table 3 below. The feature vector $\vec{F_4}$ can be obtained by combining each $u_F$. Hence, given a message m:

$\vec{F_4}=[u_F|u \in URLs(m)]$.

TABLE 3

Embedded URL Features
Extracted Features

Length (total number of characters in SLD)
Vowels (total number of vowels in SLD)
Consonants (total number of consonants present in SLD)
Digits (total number of digits in SLD)
Special characters (total number of special characters in SLD)

A SVM-LR classifier can be trained using sample malicious and legitimate URLs compiled from public repositories (e.g., alexa.com). The classifier takes as input feature vector $\vec{F_4}$ and computes matching score $S_4$ as follows:

$$S_4 = \frac{1}{1 + e^{f(\vec{F_4})}}$$

Methods for Authenticating a Sender of an Online Message

Figure 7:
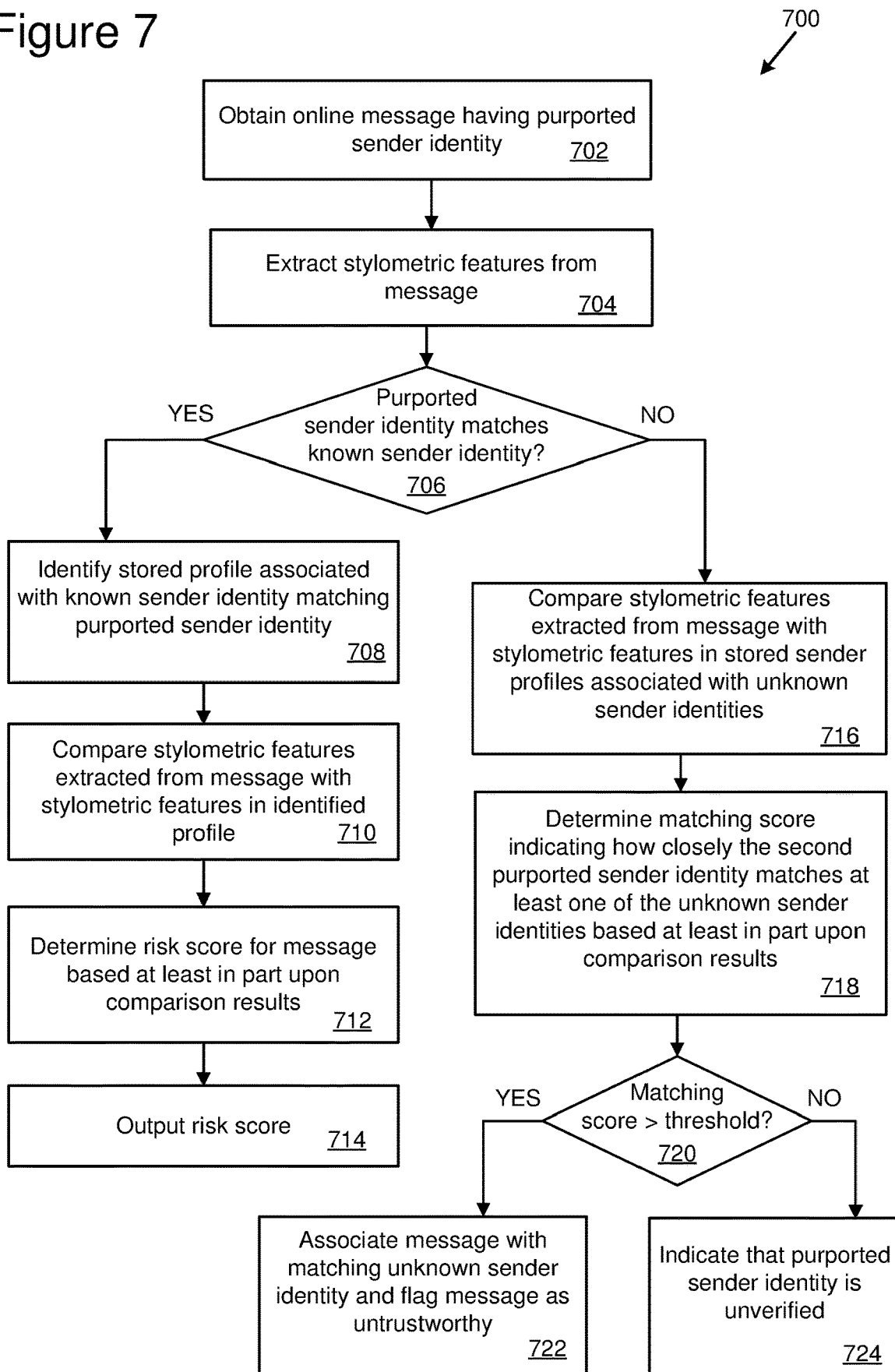
FIG. 7 is a flowchart of an example method for authenticating a sender of an online message based at least in part upon stylometric features extracted from the message.

FIG. 7 is a flowchart of an example method 700 for authenticating a sender of an online message based at least in part upon stylometric features extracted from the message. The example method 700 can be performed by one or more computing devices. For example, the example method 700 can be performed by computing device 102 and/or server 104 of FIG. 1.

At 702, an online message having a purported sender identity is obtained. In some examples, the purported sender identity may be indicated by an email address and name associated with the message, which can be set via an online messaging tool used to send the message (and thus not necessarily authentic).

At 704, stylometric features are extracted from the message. For example, as discussed above with reference to FIG. 4, this may include performing pre-processing on message contents in which the message contents are divided into discrete blocks of characters, and then performing stylometric analysis on the blocks of characters to obtain a feature vector.

At 706, a determination is made as to whether the purported sender identity matches a known sender identity. For example, a list of known sender identities having sender profiles stored in the data store may be consulted. Alternatively, an email address of the message can be compared to a list of email addresses for known sender identities to determine whether there is a match.

If the answer at 706 is YES, indicating that the purported sender identity matches a known sender identity, the method proceeds to 708. At 708, a stored profile associated with the known sender identity matching the purported sender identity is identified (e.g., obtained from a data store).

At 710, stylometric features extracted from the message are compared with stylometric features in the identified profile. The comparison may be performed using the identity verifier module 302 of FIG. 3, for example. For example, the feature vector obtained at 704 can be submitted to a classification model to obtain an individual matching score $S_1$ for the message contents.

At 712, a risk score reflecting a likelihood that the purported sender identity is inauthentic is determined based at least in part upon the results of the comparison performed at 710. For example, the risk score can be determined based at least in part upon (e.g., as a function of) the individual matching score $S_1$. Optionally, the risk score can be a global risk score determined based on matching scores for other message features in addition to matching score $S_1$.

At 714, the risk score determined at 712 is output. For example, as shown in FIG. 1, the risk score can be displayed by a mail client, e.g., as a label for the online message.

Returning to 706, if the answer is NO, indicating that the purported sender identity does not match a known sender identity, the method proceeds to 716. At 716, the stylometric features extracted from the message are compared with stylometric features in stored sender profiles associated with recognized suspicious sender identities. In other examples, in addition to the comparison of stylometric features, an email address and/or name associated with the purported sender identity may be compared to email addresses and/or names in the stored sender profiles associated with the recognized suspicious sender identities.

At 718, a matching score indicating how closely the second purported sender identity matches at least one of the recognized suspicious sender identities is produced, based at least in part upon the results of the comparison performed at 716.

At 720, a determination is made as to whether the matching score produced at 718 is greater than a threshold. The threshold can be a predetermined threshold. In some examples, an administrator of the online messaging account and/or an account owner of the online messaging account can adjust the threshold via a user interface.

If the answer at 720 is YES, indicating that the matching score is greater than the threshold, the method proceeds to 722.

At 722, the message is associated with the matching recognized suspicious sender identity. For example, the sender profile for the matching recognized suspicious sender identity can be updated based on the features extracted from the message.

Further, at 722, the message can be flagged as untrustworthy. This can include storing the message in an untrustworthy messages folder, for example.

Returning to 720, if the answer is NO, indicating that the matching score is not greater than the threshold, the method proceeds to 724.

At 724, it is indicated that the purported sender identity is unverified. This may include displaying the message with an "unverified" label in a user interface of an online messaging application. In this case, as discussed above, determination of the risk score can be performed based on other factors. Even if these other factors give more positive outlook on the new sender, its labeling as unverified can remind the recipient of the message to be cautious with this particular message.

Figure 8:
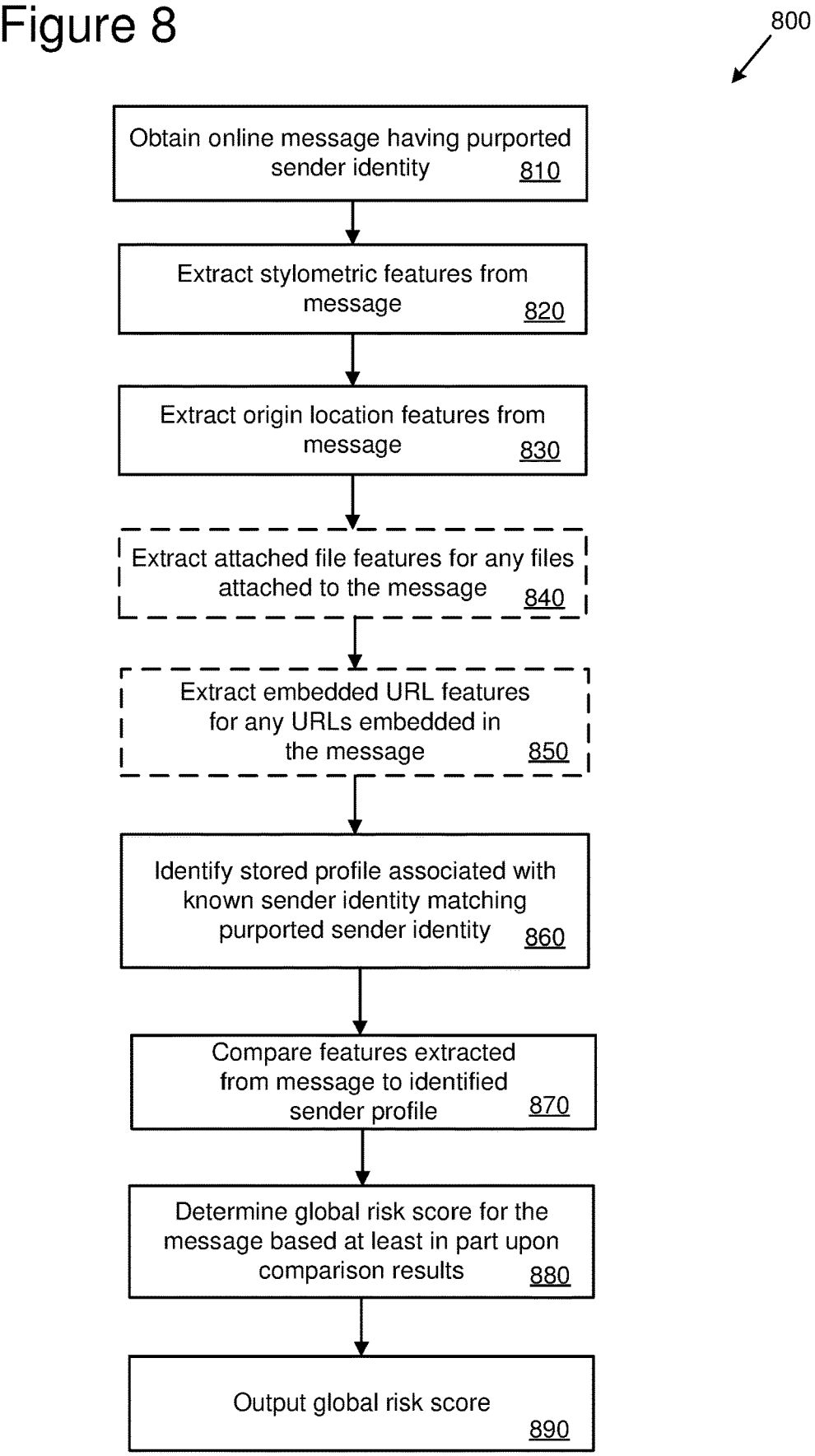
FIG. 8 is a flowchart of an example method for authenticating a sender of an online message based at least in part upon stylometric features, origin location features, attached file features, and/or embedded URL features extracted from the message.

FIG. 8 is a flowchart of an example method 800 for authenticating a sender of an online message based at least in part upon stylometric features, origin location features, attached file features, and/or embedded URL features extracted from the message. The example method 800 can be performed by one or more computing devices. For example, the example method 800 can be performed by computing device 102 and/or server 104 of FIG. 1.

At 810, an online message having a purported sender identity is obtained, e.g., in the manner discussed above with reference to FIG. 7 at 702.

At 820, stylometric features are extracted from the message, e.g., in the manner discussed above with reference to FIG. 7 at 704.

At 830, origin location features are extracted from the message. For example, the origin location features can include a latitude and longitude of a location from which the message was sent, as well as an IP address of a computing device from which the message was sent.

Optionally, at 840, attached file features are extracted from the message. For example, the attached file features can include the features listed in Table 1 above.

Optionally, at 850, embedded URL features are extracted from the message. For example, the embedded URL features can include a total number of characters in the SLD of each embedded URL, a total number of vowels in the SLD of each embedded URL, a total number of consonants present in the SLD of each embedded URL, and/or a total number of special characters in the SLD of each embedded URL.

At 860, a stored profile associated with the known sender identity matching the purported sender identity is identified, e.g., in the manner discussed above with reference to FIG. 7 at 708.

At 870, the features extracted from the message are compared with the features in the identified profile. For example, the different types of features may be submitted to different modules (e.g., modules 302, 304, 306, and 308 of FIG. 3), which perform various operations resulting in output of respective matching scores for the different types of features.

At 880, a global risk score for the message is determined based at least in part upon the results of the comparison performed at 870. For example, as discussed above, the global risk score can be determined based on a global matching score which is a function of the individual matching scores for the different types of features.

At 890, the global risk score determined at 880 is output, e.g., in the manner discussed above with reference to FIG. 7 at 714.

Figure 9:
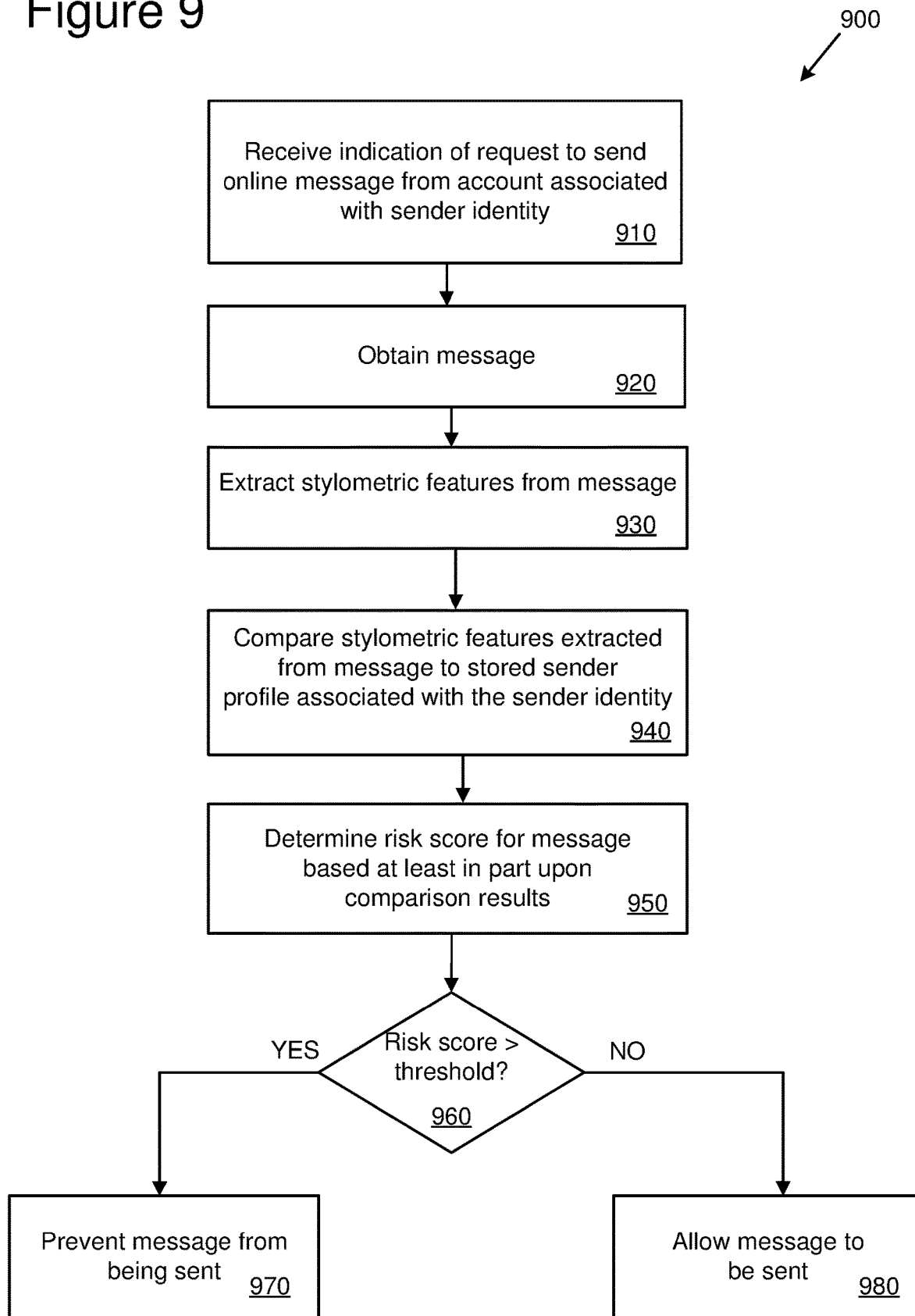
FIG. 9 is a flowchart of an example method for authenticating a sender of an outbound online message based at least in part upon stylometric features extracted from the message.

FIG. 9 is a flowchart of an example method 900 for authenticating a sender of an outbound online message based at least in part upon stylometric features extracted from the message. The example method 900 can be performed by one or more computing devices. For example, the example method 900 can be performed by computing device 102 and/or server 104 of FIG. 1.

At 910, an indication of a request to send an online message from an account associated with a sender identity is received. For example, an indication of a request to send an online message can be received when a user accessing an online messaging account presses a "send" button after composing the message. In other examples, however, an indication of a request to send an online message can be received when a user accessing the online messaging account opens a new message and/or begins to compose a message.

At 920, the message is obtained.

At 930, stylometric features are extracted from the message, e.g., in the manner discussed above with reference to FIG. 7 at 704.

At 940, the stylometric features extracted from the message are compared with a stored sender profile associated with the sender identity, e.g., in the manner discussed above with reference to FIG. 7 at 710.

At 950, a risk score for the message is determined based at least in part upon the results of the comparison performed at 940, e.g., in the manner discussed above with reference to FIG. 7 at 712.

At 960, a determination is made as to whether the risk score is greater than a threshold. The threshold may be a predetermined threshold between 0 and 100. In some examples, an administrator of the online messaging account and/or an account owner of the online messaging account can adjust the threshold via a user interface.

If the answer at 960 is YES, indicating that the risk score is greater than the threshold, the method proceeds to 970. At 970, the message is prevented from being sent (e.g., blocked from being sent by a mail client). Optionally, the account owner can be alerted of possible hijacking at this stage (e.g., by phone or a different online messaging account owned by the account owner), and/or all access to the online messaging account may be temporarily frozen.

Returning to 960, if the answer is NO, indicating that the risk score is not greater than the threshold, the method proceeds to 980. At 980, the message is allowed to be sent.

Computing Systems

Figure 10:
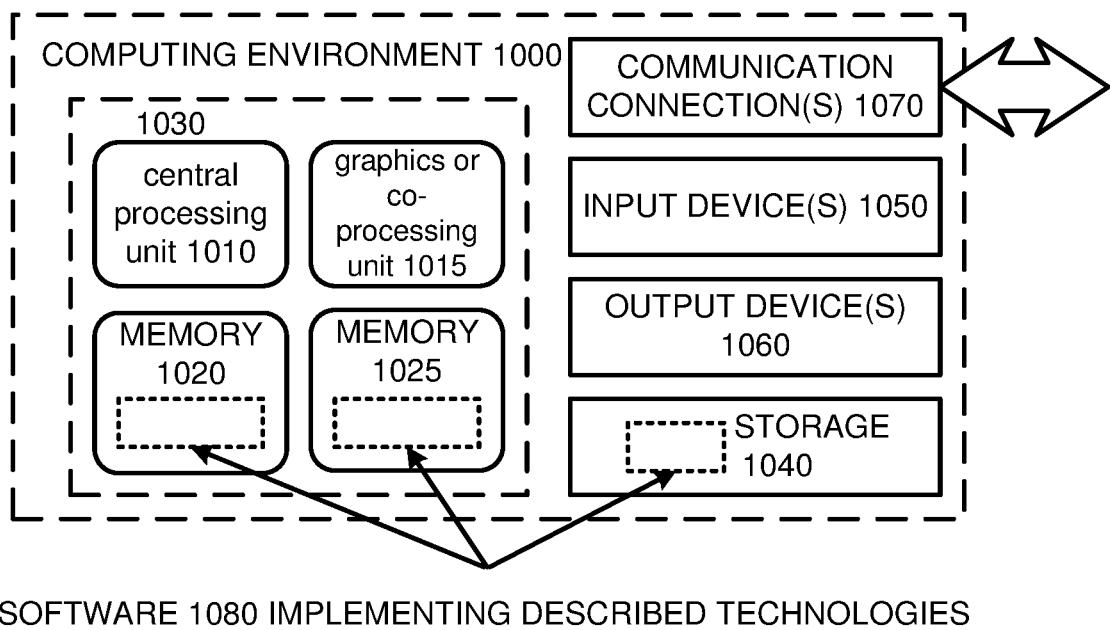
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 11:
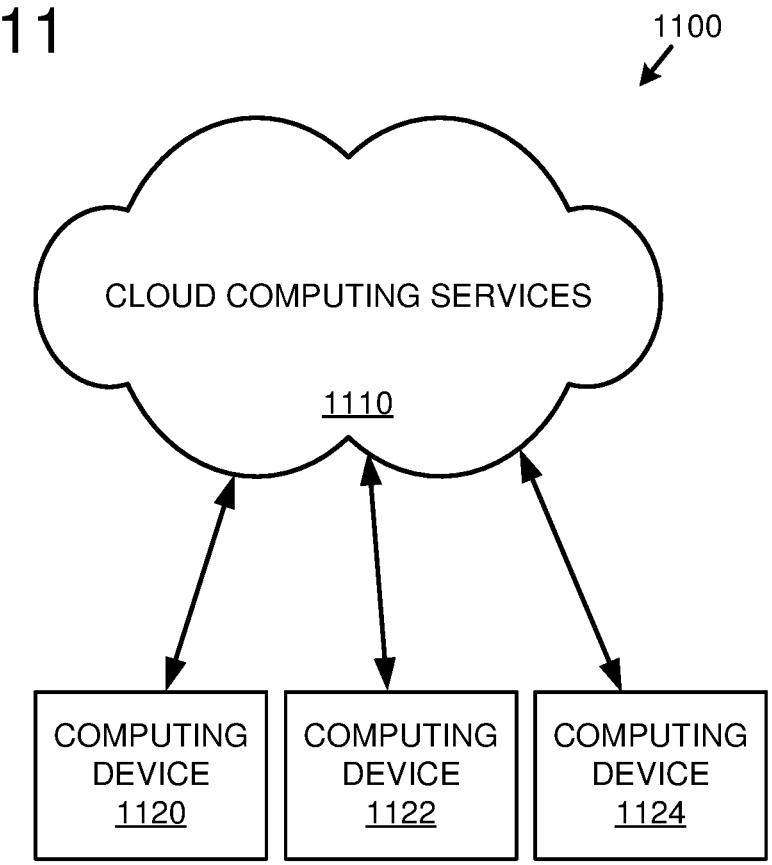
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, database resources, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections, such as 1070.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method, performed by one or more computing devices, for authenticating a sender of an online message, the method comprising:
   obtaining an online message having a purported sender identity;
   extracting stylometric features from the message, wherein the stylometric features extracted from the message comprise at least a first stylometric feature and a second stylometric feature;
   determining a first information gain associated with the first stylometric feature;
   determining a second information gain associated with the second stylometric feature;
   determining a third information gain associated with a third stylometric feature, the third stylometric feature obtained by merging the first and second stylometric features;
   determining that the third information gain is greater than the first information gain and the second information gain;
   responsive to determining that the third information gain is greater than the first information gain and the second information gain, excluding the first and second stylometric features from a subset of stylometric features including the stylometric features extracted from the message, and adding the third stylometric feature to the subset of stylometric features;
   identifying, in a data store storing respective profiles for a plurality of known sender identities and recognized suspicious sender identities, a profile associated with a known sender identity matching the purported sender identity, wherein the stored profile for a given sender identity includes stylometric features extracted from one or more messages previously sent by the sender identity;
   comparing the stylometric features extracted from the message with stylometric features in the identified profile associated with the known sender identity matching the purported sender identity, wherein comparing the stylometric features extracted from the message with the stylometric features in the identified profile comprises comparing only the subset of stylometric features with the stylometric features in the identified profile;
   determining a risk score for the message based at least in part upon results of the comparison; and
   outputting the risk score.

2. The method of claim 1, wherein the online message is a first online message having a first purported sender identity, the method further comprising:
   obtaining a second online message having a second purported sender identity different than the first purported sender identity;
   extracting stylometric features from the second message;
   determining that none of the known sender identities having profiles stored in the data store match the second purported sender identity;
   comparing the stylometric features extracted from the second message with stylometric features in the profiles of the recognized suspicious sender identities stored in the data store; and
   based at least in part upon the comparison of the stylometric features extracted from the second message with the stylometric features in the profiles of the recognized suspicious sender identities stored in the data store, producing a matching score indicating how closely the second purported sender identity matches at least one of the recognized suspicious sender identities.

3. The method of claim 2, further comprising:
   determining that the matching score is greater than a predetermined threshold for one of the recognized suspicious sender identities; and
   based upon determining that the matching score is greater than the predetermined threshold, associating the second message with the matching recognized suspicious sender identity, and flagging the second message as untrustworthy.

4. The method of claim 2, further comprising:
   determining that the respective matching scores for all of the recognized suspicious sender identities are less than a predetermined threshold; and
   based upon determining that the respective matching scores are all less than the predetermined threshold, indicating that the second purported sender identity is an unverified identity.

5. The method of claim 1, further comprising:
   determining that the risk score is lower than a predetermined threshold; and
   updating the profile of the known sender identity based at least in part upon the stylometric features extracted from the message.

6. The method of claim 1, wherein the stored profile for a given sender identity further includes a location profile for the sender identity, the location profile produced based at least in part upon an origin location of one or more messages previously sent by the sender identity and IP addresses associated with the one or more messages previously sent by the sender identity, the method further comprising:
   determining an origin location of the message; and
   comparing the origin location of the message with the location profile associated with the known sender identity,
   wherein the determination of the risk score is further based at least in part upon results of the comparison of the origin location of the message with the location profile associated with the known sender identity.

7. The method of claim 1, wherein the message includes one or more attached files, the method further comprising:
   extracting one or more attributes from each of the attached files; and
   comparing the extracted attributes with attached file attributes in the identified profile,
   wherein the determination of the risk score is further based at least in part upon results of the comparison of the extracted attributes with the attached file attributes in the identified profile, and
   wherein the attributes comprise one or more of the following: a file name, a file format, or a file size.

8. The method of claim 1, wherein the message includes one or more embedded URLs, the message further comprising:

extracting one or more features of each embedded URL; and
comparing the extracted features of each embedded URL with embedded URL features in the identified profile, wherein the determination of the risk score is further based at least in part upon results of the comparison of the extracted features of each embedded URL with the embedded URL features in the identified profile.

9. The method of claim 8, further comprising:
analyzing the extracted features of each embedded URL using a classifier, the classifier trained using sample malicious and legitimate URLs,
wherein the determination of the risk score is further based at least in part upon results of the analysis.

10. The method of claim 8, wherein the one or more features extracted from each embedded URL are extracted from a second level domain (SLD) of the URL, and comprise one or more of the following: a total number of characters in the SLD, a total number of vowels in the SLD, a total number of consonants in the SLD, a total number of digits in the SLD, or a total number of special characters in the SLD.

11. The method of claim 1, wherein comparing the stylometric features extracted from the message with stylometric features in the identified profile comprises determining a ratio of a number of unique n-grams shared by a block of characters of the message and a training set, the training set comprising a plurality of blocks of characters from the one or more messages previously sent by the known sender identity.

12. The method of claim 11, wherein comparing the stylometric features extracted from the message with stylometric features in the identified profile further comprises comparing the ratio to a threshold for the known sender identity, the threshold derived using supervised learning.

13. The method of claim 1, further comprising:
determining a first information entropy of the first stylometric feature; and
determining a second information entropy of the second stylometric feature,
wherein the determination of the first information gain is based at least in part on the first information entropy, and wherein the determination of the second information gain is based at least in part on the second information entropy.

14. One or more computing devices comprising:
processors; and
memory;
the one or more computing devices configured, via computer-executable instructions, to perform operations for determining a risk score associated with an online message, the operations comprising:
obtaining an online message having a purported sender identity;
extracting stylometric features from the message, wherein the stylometric features extracted from the message comprise at least a first stylometric feature and a second stylometric feature;
determining a first information gain associated with the first stylometric feature;
determining a second information gain associated with the second stylometric feature;
determining a third information gain associated with a third stylometric feature, the third stylometric feature obtained by merging the first and second stylometric features;
determining that the third information gain is greater than the first information gain and the second information gain;
responsive to determining that the third information gain is greater than the first information gain and the second information gain, excluding the first and second stylometric features from a subset of stylometric features including the stylometric features extracted from the message, and adding the third stylometric feature to the subset of stylometric features;
extracting origin location features from the message;
extracting attached file features for any files attached to the message;
extracting embedded URL features for any URLs embedded in the message;
identifying, in a data store, a sender profile for a known sender identity matching the purported sender identity, the sender profile comprising features, including stylometric features, extracted from one or more messages previously sent by the known sender identity;
comparing the extracted features to the sender profile, comprising comparing only the subset of stylometric features with the stylometric features in the sender profile;
determining a global risk score for the message based at least in part upon the comparison; and
outputting the global risk score.

15. The one or more computing devices of claim 14, wherein the extracted stylometric features, message origin features, embedded URL features, and attached file features are stored in respective feature vectors, wherein comparing the extracted features to the sender profile comprises, for each feature vector, submitting the feature vector to a classification model, using the classification model to match the feature vector to the sender profile, and determining an individual risk score and a classification error rate for the feature vector.

16. The one or more computing devices of claim 15, wherein the operations further comprise assigning respective weights to the individual risk scores based on the respective classification error rates for the feature vectors, and wherein the determination of the global risk score for the message is based at least in part on the individual risk scores and the assigned weights.

17. The one or more computing devices of claim 14, wherein the data store stores a plurality of sender profiles for known sender identities and a plurality of sender profiles for recognized suspicious sender identities, each sender profile comprising features extracted from one or more messages previously sent by the corresponding sender identity, and wherein the operations further comprise:
determining that none of the known sender identities having sender profiles stored in the data store match the purported sender identity;
responsive to the determining, comparing the features extracted from the message having the purported sender identity to the sender profiles stored in the data store for the recognized suspicious sender identities.

18. One or more computer-readable storage media storing computer-executable instructions for execution on one or more computing devices to perform operations for determining a risk score associated with an online message, the operations comprising:

receiving an indication of a request to send an online message from an account associated with a sender identity;

obtaining the message;

extracting stylometric features from the message, wherein the stylometric features extracted from the message comprise at least a first stylometric feature and a second stylometric feature;

determining a first information gain associated with the first stylometric feature;

determining a second information gain associated with the second stylometric feature;

determining a third information gain associated with a third stylometric feature, the third stylometric feature obtained by merging the first and second stylometric features;

determining that the third information gain is greater than the first information gain and the second information gain;

responsive to determining that the third information gain is greater than the first information gain and the second information gain, excluding the first and second stylometric features from a subset of stylometric features including the stylometric features extracted from the message, and adding the third stylometric feature to the subset of stylometric features;

comparing the stylometric features extracted from the message to a sender profile associated with the sender identity, wherein the sender profile associated with the sender identity is stored in a data store and comprises stylometric features extracted from one or more messages previously authenticated and sent by the account associated with the sender identity, and wherein comparing the stylometric features extracted from the message with the stylometric features in the sender profile comprises comparing only the subset of stylometric features with the stylometric features in the sender profile;

determining a risk score for the message based at least in part upon the comparison; and determining that the risk score is greater than a predetermined threshold; and responsive to determining that the risk score is greater than the predetermined threshold, preventing the message from being sent.

19. The one or more computer-readable storage media of claim 18, wherein the operations further comprise:

extracting message origin features, embedded URL features, and attached file features from the message; and comparing the extracted message origin features, embedded URL features, and attached file features to the sender profile, wherein the determination of the risk score for the message is further based at least in part on the comparison of the extracted message origin features, embedded URL features, and attached file features to the sender profile.

* * * * *